United States Patent [19]

Bietz et al.

[11] Patent Number: 4,656,896
[45] Date of Patent: Apr. 14, 1987

[54] PROCESS FOR THE POSITIONING OF A POINT BELONGING TO THE CUTTING ZONE OF A TOOL AND APPARATUS FOR PERFORMING THIS PROCESS IN A DIGITALLY CONTROLLED LATHE

[75] Inventors: Bernard Bietz, Morolles en Hurepoix; Jacques van der Vliet, Sevres; Michel Cartant, Paris, all of France

[73] Assignee: Commissariat a L'energie Atomique, Paris, France

[21] Appl. No.: 853,725

[22] Filed: Apr. 18, 1986

[30] Foreign Application Priority Data

Apr. 19, 1985 [FR] France ................ 85 06002

[51] Int. Cl.$^4$ .................. B23B 1/00; B23B 25/06
[52] U.S. Cl. .................... 82/1 C; 33/181 R; 33/201; 356/152; 356/153; 356/400; 358/107
[58] Field of Search .......... 82/1 C, 2 B, 34 R; 33/181 R, 185 R, 201; 356/152, 153, 400; 358/107

[56] References Cited

U.S. PATENT DOCUMENTS

| | | |
|---|---|---|
| 2,629,936 | 3/1953 | Cronstedt .................... 82/1 C |
| 3,738,204 | 6/1973 | Spriggs ....................... 82/2 R |
| 3,835,528 | 9/1974 | Garrett . | |
| 4,018,113 | 4/1977 | Blazenin et al. ............. 82/2 B |
| 4,329,785 | 5/1982 | Peterson ..................... 33/201 |

FOREIGN PATENT DOCUMENTS

| | | |
|---|---|---|
| 2041385 | 2/1972 | Fed. Rep. of Germany . |
| 2806141 | 9/1978 | Fed. Rep. of Germany ........ 82/2 B |
| 2302817 | 10/1976 | France . |
| 1063140 | 3/1967 | United Kingdom . |

Primary Examiner—Nicholas P. Godici
Assistant Examiner—Jerry Kearns
Attorney, Agent, or Firm—Michael N. Meller

[57] ABSTRACT

The invention relates to a process and an apparatus for positioning a point belonging to the cutting zone of a tool in a digitally controlled lathe.

The process consists of obtaining the image of the contact point of the tool cutting zone in a virtual relative mark with two perpendicular axes and then bringing about coincidence between the origin of the relative mark and the rotation axis of the tool holder capstan. The process then involves bringing about coincidence between the chosen contact point and the origin of the relative mark. The contact point is then made to coincide with the intersection point of the axes of an absolute fixed reference mark.

Application to the regulation of the position of a tool in a digitally controlled lathe.

7 Claims, 13 Drawing Figures

PROCESS FOR THE POSITIONING OF A POINT BELONGING TO THE CUTTING ZONE OF A TOOL AND APPARATUS FOR PERFORMING THIS PROCESS IN A DIGITALLY CONTROLLED LATHE

BACKGROUND OF THE INVENTION

The present invention relates to a process for positioning a point belonging to the cutting zone of a tool in a digitally controlled lathe. It also relates to an apparatus making it possible to perform this process. It applies to the very precise positioning of a point of a cutting zone of a tool in a digitally controlled, very high precision lathe.

It is known that in a digitally controlled lathe, the profile of the parts to be machined is obtained from a planar trajectory of the tool defined in a fixed working mark or station, linked with the lathe frame. This mark is defined by the rotation axis of the part (chuck axis) and by a plane perpendicular to said rotation axis. If several tools are necessary for machining a part, the programmed trajectory corresponds to that of the fixing point common to each tool on the tool-holder capstan or turret.

A first method for positioning a point of a tool belonging to the cutting zone consists of previously measuring the length of each tool and then storing said length in the digital control system, which consequently performs an initial correction of the working mark.

The measurement of the length of the tool is carried out outside the lathe on an optical or mechanical measuring or test bench, which requires the removal and refitting of the tool which has to pass from the work place to the test bench and vice versa. This transfer considerably reduces precision.

A second method consists of measuring the length of each tool, when the latter is in place on the lathe, using optical or mechanical measuring means occupying a clearly defined position in the fixed mark linked with the machine. This method suffers from the disadvantage of having to be repeated for each tool.

Both these method lack precision, because in both of them the measurements of the tool are only carried out relative to two directions of the working mark. In the best of cases, even if the working edge of the tool is likened to a circle and even if the programming of the trajectory of the tool point belonging to this edge and to the cutting zone is brought to the centre of the circle, any circularity defect of the edge of the tool will lead to an imprecision of the profile to be machined.

In a high precision, digitally controlled lathe, where only one predetermined point of the cutting zone of the tool machines the part, it is necessary to mark the tangents at each point on the profile, said tangents making it possible to orient the tool permanently during machining, so that only the chosen contact point is involved. One of the aforementioned methods makes possible such a precise marking of the tangents.

SUMMARY OF THE INVENTION

The object of the present invention is to obviate the aforementioned disadvantages of the prior art processes and apparatuses and making it possible in digitally controlled lathes to position a point of the cutting zone of a tool relative to the part to be machined. It in particular makes it possible to improve the precision of the positioning of said point, whilst facilitating said positioning.

The invention is particularly useful for a digitally controlled lathe and makes it possible to avoid the imprecisions resulting from the aforementioned methods.

It is known that a digitally controlled lathe has a fixed frame and on the latter at least a first and a second slide. This lathe also comprises means for displacing the slides in translations respectively parallel to first and second directions which are perpendicular to one another. One of these directions is parallel to the axis of the spindle or tool-holding chuck. This lathe also comprises a capstan with a tool holder, supported by one of the sldies as well as means for rotating said capstan about an axis perpendicular to the first and second directions. Finally, the lathe comprises a programmable control unit connected to the means for bringing about the displacement in translation and rotation in order to apply thereto displacement control signals. This control unit makes it possible to maintain the sole chosen contact point between the cutting zone and the part during machining. The program recorded in a memory of the control unit obviously makes it possible to obtain the desired machining profile.

It is in a known lathe of the aforementioned type that are used the process and apparatus according to the invention, which make it possible to very accurately position a predetermined point belonging to a cutting zone of a tool, so that only this single point remains in contact with the profile of the part during machining.

The invention firstly relates to a process for positioning a point of the cutting zone of a tool in a digitally controlled lathe, said lathe comprising a fixed frame and on the latter first and second slides, means for displacing these slides in translations respectively parallel to first and second directions X, Y which are perpendicular to one another, direction X being parallel to direction X' of a virtual axis of a spindle of the lathe, a capstan with a tool holder supported by one of said slides and means for displacing said capstan in rotation about a virtual rotation axis Z'Z perpendicular to the first and second directions, and a programmable control unit connected to the means for displacement in translation and rotation, in order to apply thereto displacement control signals, to maintain only said single point in contact with said part during machining, the process comprising optically determining the position of said point in an absolute fixed reference mark, wherein said optical determination comprises obtaining the image of said contact point and the image of a virtual relative mark with two perpendicular axes, then by rotating the capstan, displacement of the tool in the tool holder and displacement of the image of the relative mark, to bring about coincidence between the origin of the relative mark and the virtual rotation axis Z'Z of the capstan, said process then consisting of rotating the axes of the virtual relative mark and marking one of the two directions, so as to bring about coincidence between one of the axes of the virtual relative mark and the direction X' of the spindle, then bringing about coincidence between the chosen contact point and the origin of the virtual relative mark, the cutting zone of the tool being tangential to one of the two axes at said contact point, the orientation of the tool being chosen with respect to one of the two axes of the virtual relative mark; then obtaining the image of the absolute fixed reference mark, then displacing the slides to bring said contact point and the intersection point of the axes of the relative mark into coincidence with the origin of said absolute mark, the translation displacements of the slides being measured relative to the two axes of said absolute mark.

According to another feature, the process also consists of marking the axis of the spindle in a plane perpendicular to the first and second directions X, Y, obtaining the image of another reference mark with two perpendicular axes, one of said two axes being parallel to the virtual axis of the spindle, then by translation movements of the image of said other reference mark bringing the intersection point of the two axes of said mark into coincidence with the virtual axis of the spindle, the tool then being displaced in the capstan parallel to the virtual axis of the spindle, so that the image of said contact point is made to coincide with the intersection of the axes of said other reference mark.

The invention also relates to an apparatus for positioning a point of a cutting zone of a tool in a digitally controlled lathe, said lathe having a fixed frame and on the latter first and second slides, means for displacing these slides in translations respectively parallel to first and second directions which are perpendicular to one another, one of these directions being parallel to a rotation axis of a part-holding spindle of the lathe, a capstan with tool holder supported by one of the slides and means for rotating said capstan about a rotation axis perpendicular to the first and second directions, and a programmable control unit connected to the means for displacement in translation and rotation for the application thereto of displacement control signals, so that only said single point is kept in contact with said part during machining, means for fixing the position of said point in a virtual relative mark linked with the slides and means for determining the position of said point in an absolute reference mark linked with the frame, wherein this apparatus comprises means for obtaining the image of said contact point and mobile means making it possible to obtain the image of a virtual relative mark having two axes respectively parallel to the first and second directions, the origin of the image of the relative mark and the virtual image of the rotation axis being brought into coincidence and the axes of the relative mark being positioned parallel to the two directions, an angular orientation of the tool being chosen with respect to one of the two axes of the virtual relative mark, whilst the image of the contact point is made to coincide with the capstan axis; means for obtaining the image of the absolute fixed reference mark, the displacements of the slides bringing the contact point and the origin of the virtual relative mark into coincidence with the origin of said absolute mark, the rotation displacements of the capstan being defined for the control unit by angles measured with respect to one of the two axes of said absolute mark and translation displacements of the slides being measured with respect to the two axes of said absolute mark during machining.

According to another feature, the means for obtaining the images of said contact point, the virtual relative mark and the absolute mark comprise a light source and a condenser emitting in the direction of the cutting zone of the tool a light beam parallel to said virtual rotation axis, a sloping plane mirror for reflecting the beam by 90° parallel to one of the two directions, an objective or lens for obtaining in an image plane the images of the contact point, the virtual relative mark and the absolute mark, as well as means for collecting these images, the virtual relative mark being formed by the image of a first planar reticule with two perpendicular crossed lines defining the axes of said relative mark, the intersection of the images of these two lines constituting the origin of the relative mark, said first reticule being placed on one of the slides on the path of the beam reflected by the mirror between said mirror and the objective, one of the lines of said first reticule being parallel to the axis of the part-holding spindle, the plane of said first reticule being perpendicular to the beam reflected by the mirror, said first reticule also being provided with means for the displacement in directions respectively parallel to said two directions, the absolute reference being formed by the image of a second planar reticule with two perpendicular crossed lines, integral with the machine frame, the plane of said second reticule being perpendicular to the beam from the condenser, the lines of said second reticule being respectively parallel to said two directions, the intersection of the images of the two lines of said second reticule constituting the origin of the absolute reference mark, the means for collecting the image of the cutting zone also collecting the images of the first and second reticules.

According to another feature, the means for collecting the image of the cutting zone and the images of the first and second reticules comprise a video camera connected to a video projection apparatus, said camera being carried by the slide on which is disposed the first reticule, the lens of said camera being directed towards the first reticule.

According to another feature, the apparatus also comprises mobile means for defining another reference mark with two perpendicular axes, means for obtaining the image of said other reference mark and the contact point, the intersection of the two axes of said other reference mark being made to coincide with the axis of the spindle, and means for displacing the tool holder parallel to the rotation axis to bring the image of the contact point into coincidence with the intersection of the two axes of said other reference mark.

According to another feature, said other reference mark is obtained from a third reticule with two perpendicular crossed lines respectively parallel to said rotation axis and said second direction Y, the means for obtaining the image of said other reference mark and the image of the contact point comprising another light source and a condenser emitting a beam of light parallel to the second direction, another sloping mirror for reflecting said beam by 90°, parallel to the axis of the spindle towards the third reticule, and a camera connected to the video projection apparatus for collecting the image of the third reticule and the image of the contact point.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
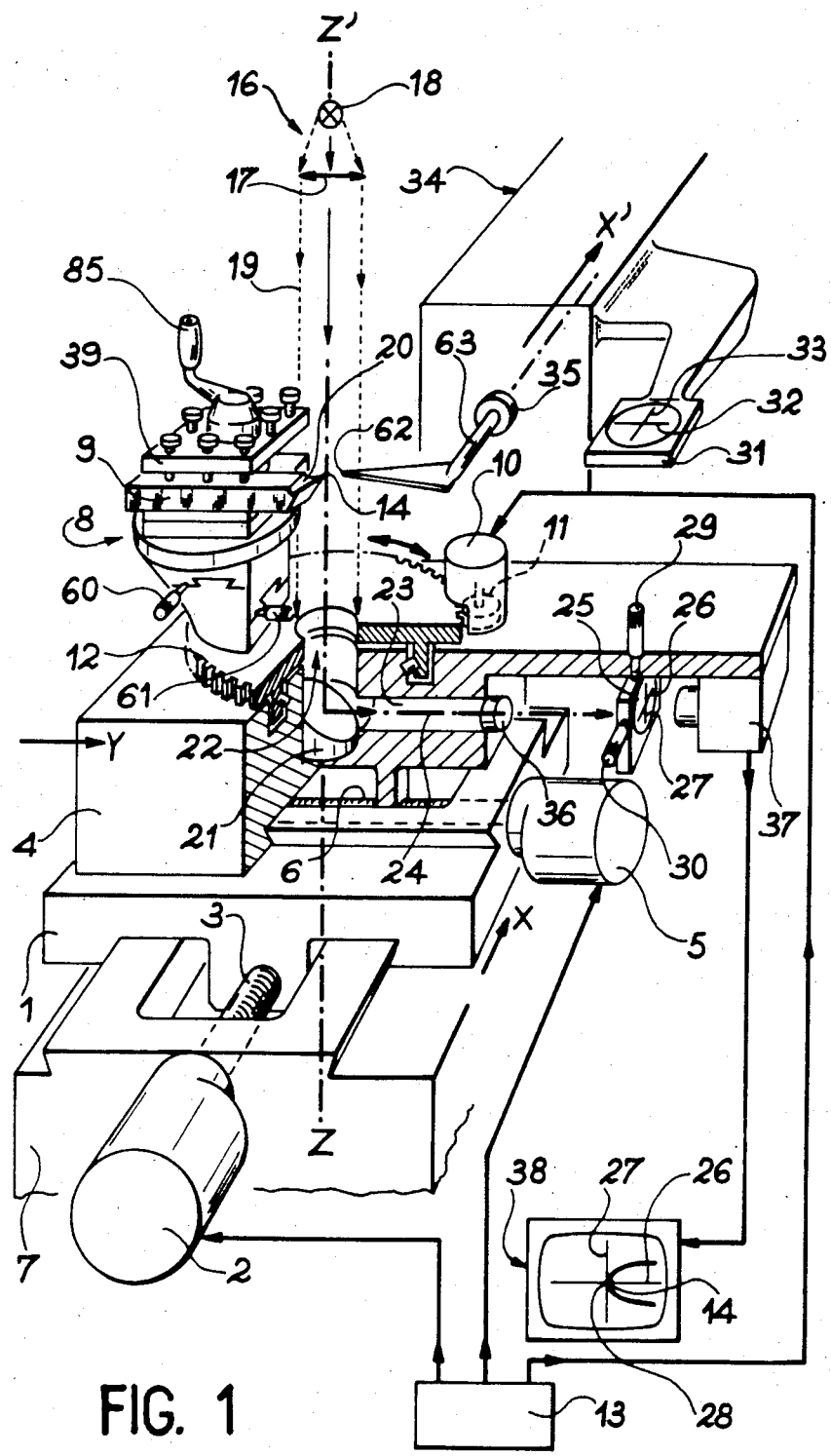
FIG. 1: Diagrammatically certain elements of a digital control lathe in which are used the process and apparatus according to the invention.

FIG. 1 diagrammatically shows in perspective and partial section certain of the components of a digitally controlled lathe, in which are used the poitioning process and apparatus according to the invention. This lathe more particularly comprises, on a fixed frame 34 (partly shown in the drawing), a first slide 1 and means constituted e.g. by a motor 2 driving a worm 3 for displacing said slide in translations parallel to the first direction of a first axis X parallel to the axis X' of a part-holding spindle 35. This lathe also comprises a second slide 4 and means e.g. constituted by a motor 5 driving a worm 6 for displacing said second slide in translations parallel to a second direction of a second axis Y perpendicular to axis X'. The directions of axes X and Y are perpendicular to one another. A support 7 of the first slide 1 can be integral with the frame of the lathe or integral with a saddle which is mobile with respect to said frame, e.g. in the direction of axis X. This not shown saddle makes it possible to displace the first and second slides 1, 4 with respect to the lathe frame. The lathe also comprises a turret or capstan 8 carrying a tool 9 in a tool holder 39. Means e.g. constituted by a motor 10 driving a pinion 11 engaging in a toothed plate 12 supporting the capstan 8 make it possible to rotate said capstan about a vertical axis Z'Z perpendicular to the first and second directions of axes X and Y. A programmable control unit 13 is connected to the translation and rotation displacement means 2, 5, 10 in order to apply displacement control signals thereto. These means make it possible to position the chosen point 24 on the cutting zone 20 of tool 9. The prior choice and positioning of this point will be described in greater detail hereinafter. The position of this point is firstly established with respect to a relative mark and then with respect to an absolute reference mark, using the process and apparatus according to the invention. Maintaining this single point in contact with the part during machining is dependent on a program recorded in the programmable control unit 13. This program does not form part of the invention.

The apparatus according to the invention firstly comprises means for determinining the position of point 14 chosen to be in contact with the profile of the part to be machined. These means also make it possible to mark the orientation of the tool in the relative mark and in the absolute mark. The latter is linked with the lathe frame and its axes are respectively parallel to axes X, Y and Z.

The means making it possible to obtain the image of the contact point comprise a condenser 16 integral with slide 1 and e.g. constituted by a lens 17, at the focus of which is placed a light source 18. Said condenser emits a light beam 19, parallel to axis Z'Z in the direction of the tool cutting zone 20 and a sloping mirror 21. This mirror reflects by 90° with respect to Z'Z a light beam 24 parallel e.g. to the first direction Z. Mirror 21 is located in a bore 22 made in the first slide 1 and in the toothed plate 12. This bore has axis Z'Z. A bore 23 is also made parallel to the second direction Y in the second slide 4. This defines a not shown relative mark, whose axes are X, Y, Z and linked with the tool holder to capstan 8 and with the two slides 1, 4. A virtual relative mark is obtained from a first planar reticule 24 with two perpendicular lines 26, 27, defining axes whose intersection point 28 constitutes the origin of the virtual relative mark. This first reticule is integral e.g. with the first slide 1 and is located on the path of the beam 24 reflected by mirror 21 perpendicular to said beam. The planar reticule 25 can rotate in its support in a plane perpendicular to the reflected beam 23, so that the lines 26, 27 can be oriented parallel to the displacement axes X, Y. This first reticule also comprises means 29, 30, e.g. constituted by micrometer screws for displacing it in its plane into perpendicular directions. A video camera 37 associated with a lens or objective 36 makes it possible to obtain the image of said first reticule on a video screen 38. Camera 38 and objective 36 are integral with the first slide 1.

The absolute reference mark can e.g. be obtained from the image of a second reticule 31 with two perpendicular crossed lines 32, 33, said reticule being integral with the machine frame 34. The plane of said second reticule is perpendicular to the beam 19 from condenser 6. The two lines 32, 33 of said second reticule are parallel to the two directions X, Y. The intersection 35 of these two lines constitutes the origin of the absolute reference mark as will be shown hereinafter.

Means 36, 37, 38 (objective, camera and video screen) making it possible to obtain with enlargement or magnification the image of the relative mark also make it possible to obtain the image of the contact point 14, as well as the image of the absolute mark. Objective 36 is e.g. constituted by a lens, in whose image plane is arranged the reticule 25. Camera 37 located to the rear of the first reticule 25 makes it possible to collect the image of the cutting zone, as well as the images of the first and second reticules 25, 31 as will be shown in greater detail hereinafter.

The setting of the position of the contact point 14 with respect to the image of the virtual relative mark, constituted by the image of the first reticule, as well as the setting of the orientation of the tool with respect to said relative mark, are obtained by the displacement of tool 9 in tool holder 39. Thus, as will be shown hereinafter, during said setting, what is sought is the coincidence on screen 38, between the chosen contact point 14 and the origin 28 of the virtual relative mark representing the rotation axis Z'Z.

The angular orientation of the tool with respect to one of the two lines 26 or 27 is also sought. Thus, line 26 is a virtual representation of axis X, whilst line 27 is a virtual representation of axis Y constituting the relative mark linked with the first slide 1.

Following the obtaining of said coincidence, the process then consists of bringing the image of the contact point and the origin 28 of the image of the virtual relative mark into coincidence with the origin 35 of the absolute mark by displacements of slides 1,4. The rotary displacements of the capstan are defined, during machining, by angles measured with respect to one of the axes 32 or 33 of the absolute fixed mark parallel to directions X, Y. The translatory displacements of the slides are measured relative to the absolute mark during machining.

On the screen of the video projection apparatus 38 are represented in exemplified manner the axes 26, 27 of the relative mark, as well as the image of the contact point 14 of the tool cutting zone 20.

FIGS. 2A to 2F will provide a better understanding of the "calibration" operations performed in the process according to the invention. As a result more particularly of reticule 25, these calibration operations comprise accurately marking the axis Z'Z of the relative mark and obtaining the images of the two axes of the virtual relative mark, which are strictly parallel to X and Y, the intersection of the two axes being strictly located on axis Z'Z.

Figure 2A:
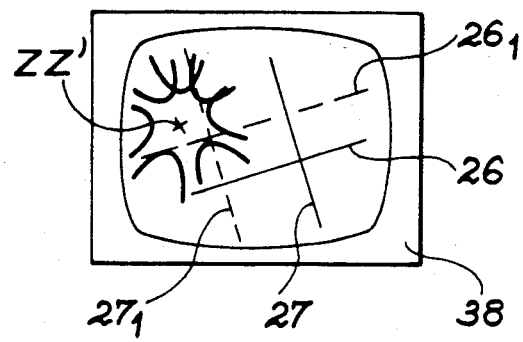
FIGS. 2A to 2F: Provide a better understanding of the marking of the position of the chosen point of the tool in a relative mark linked with the lathe slides.

FIG. 2A is the image appearing on video screen 38, when only the first reticule 25 is placed on the path of beam 24 between mirror 21 and camera 37 during a rotation of the tool about axis Z'Z. This rotation, during which the zone 14 of the tool occupies the positions shown in broken lines on the drawing, reveals the presumed position of the virtual axis Z'Z. The action on the micrometer screws 29, 30 makes it possible to displace on the screen the image of the lines 26, 27 of the reticule at 261, 271 in the direction of Z'Z.

Figure 2B:
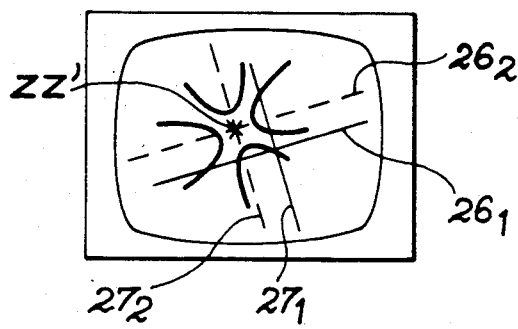
Figure 2C:
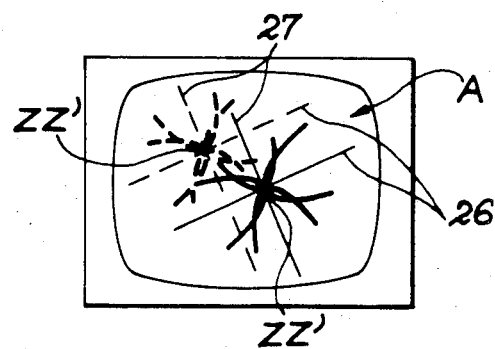

Following the movement of the tool towards the presumed centre Z'Z, as a result of the slides 60, 61 of capstan 8, FIG. 2B shows the reduction of the variation between the location of the tool image and the virtual axis Z'Z. The marking of the position Z'Z is improved, because lines 261, 271 can then be moved to 262, 272 by micrometer screws 29, 30. In order to facilitate these settings, it is preferably possible to use a memory-equipped video projector. FIG. 2C shows the perfect centring of the intersection of lines 26, 27 of reticule 25 on virtual axis Z'Z. This image can also be moved to the centre of the screen of projector 38, as represented at A, by displacement of camera 37 or by the actual video projector in per se known manner.

Figure 2D:
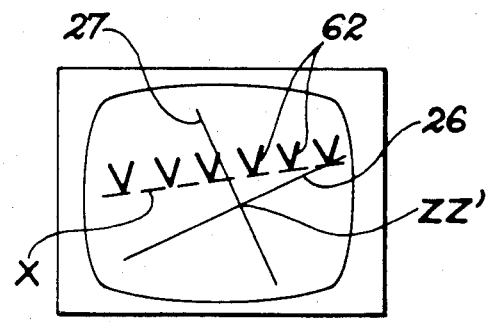
Figure 2E:
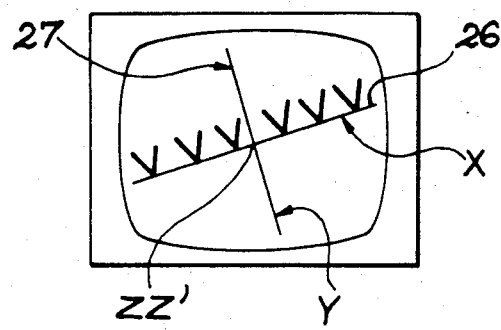
Figure 2F:
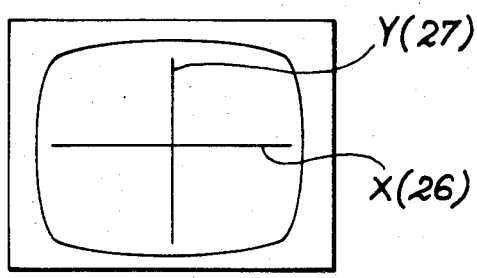

FIG. 2D shows the successive positions occupied by the pointed end 62 of an object 63 placed in the spindle 35 of said turret and moving parallel to axis X. This displacement makes it possible to display the variation between the real direction X and the line 26 having to represent it. This variation can also be displayed by maintaining fixed end 62 and by moving slide 1.

FIG. 2 shows the perfect coincidence, following the rotation of reticule 25 in its plane, between the relative mark X, Y, Z and its representation 26, 27, Z'Z on the screen of video projector 38. FIG. 2E shows the image obtained on the screen, e.g. after angular recentring of the camera (rotation thereof about axis Y).

Figure 3A:
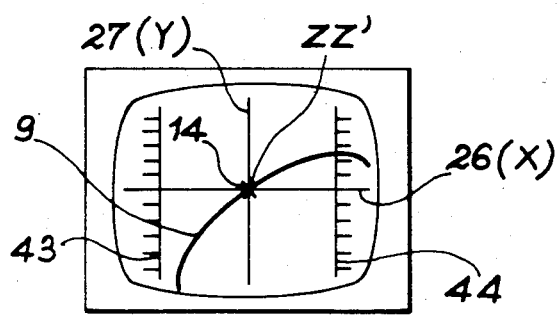
FIGS. 3A and 3B: Provide a better understanding of the marking of the orientation of the tool in the relative mark.
Figure 3B:
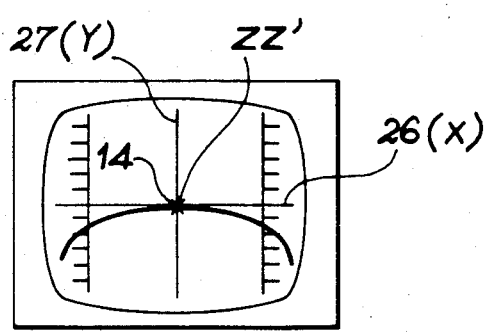

FIGS. 3A and 3B will make it easier to understand the "setting" operations performed in the process according to the invention for positioning point 14, chosen on the cutting edge of the tool, so that it is constantly in contact with the part to be machined during machining and for initializing the rotation axis of the tool holder in the absolute mark linked with the lathe.

In FIG. 3A, the chosen point 14 on the cutting edge of tool 9 is superimposed on the previously positioned axis ZZ' defined by the intersection of lines 26, 27. By rotating the tool holder capstan 12, graduations or scales 43, 44 then make it possible to bring said edge tangential to axis X (line 26 of the image on the screen) to point 14 of said cutting edge, as shown in FIG. 3B. The graduations make it possible to obtain the best position of the tool, so that the edge zone adjacent to point 14 is symmetrical with respect to line 27. It is then possible to consider that the rotation angle of the tool holder during machining is initialized in the absolute mark of the machine. These settings are not then modified before the following settings, which will now be described.

Figure 4:
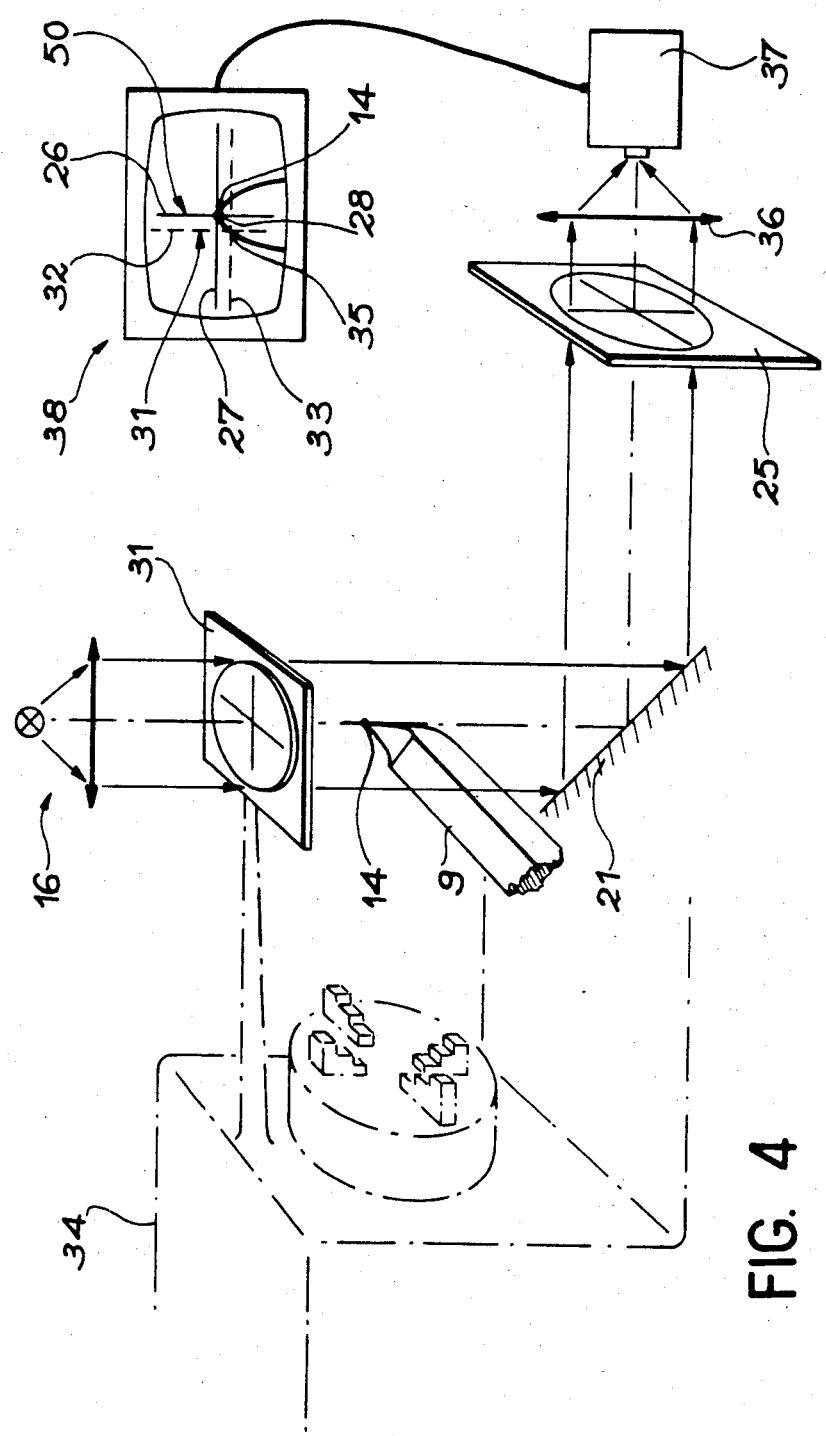
FIG. 4: Diagrammatically the apparatus according to the invention providing a better understanding of the position setting of the contact point in an absolute fixed mark linked with the machine frame.

FIG. 4 diagrammatically shows the complete lathe with its fixed frame 34, the second reticule 31 (absolute reference mark) and the reticule 25 making it possible to obtain the image of the virtual relative reference mark. It also shows condenser 16, objective 36, camera 37, video projection means 38, sloping mirror 21 and tool 9. The contact point 14 with the part to be machined, has, as has been shown hereinbefore, been positioned in the relative mark defined by the first reticule 25.

In order to simplify the drawing, the first and second slides 1, 4 and capstan 8 are not shown. The positioning process according to the invention now consists of superimposing the image 50 of the first reticule and the image 51 of the second reticule 31, whose lines 32, 33, which cross at point 35, constitute the image of the absolute reference mark. This image superimposition of two reticules is performed by moving the first and second slides 1, 4, so as to bring about the coincidence of the intersection points 28, 35 of lines 26, 27, 32 of the first and second reticles 25, 31. When this coincidence has been obtained, the programmable unit 13 can then control the movements of the slides and capstan with respect to the absolute reference mark defined by reticule 31. The angular orientation of the tool with respect to the line 27 of the first reticule is now defined with respect to line 33 of the second reticule parallel to direction X.

Figure 5:
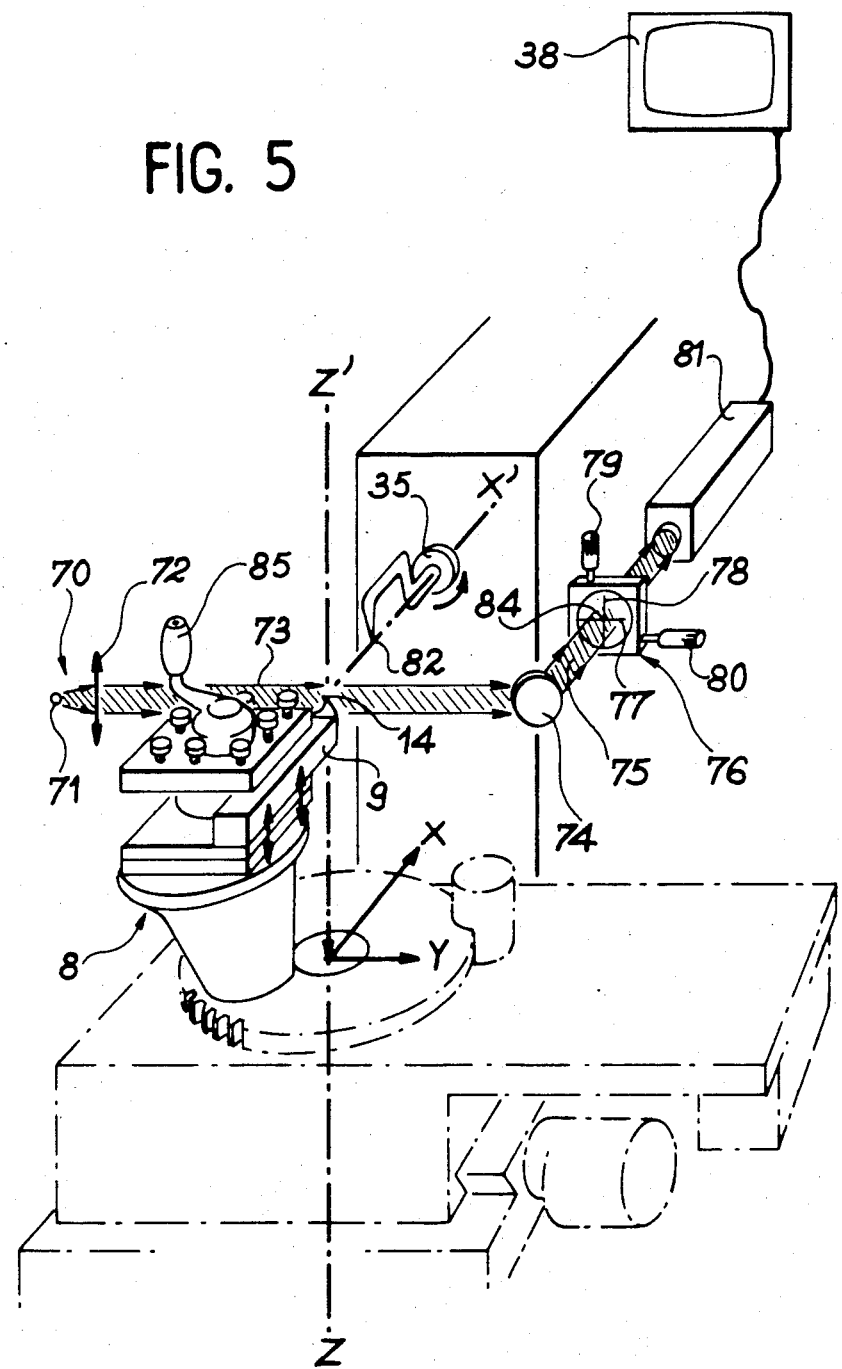
FIG. 5: Diagrammatically other means of the apparatus according to the invention making it possible to regulate the height of the contact point.
Figure 6A:
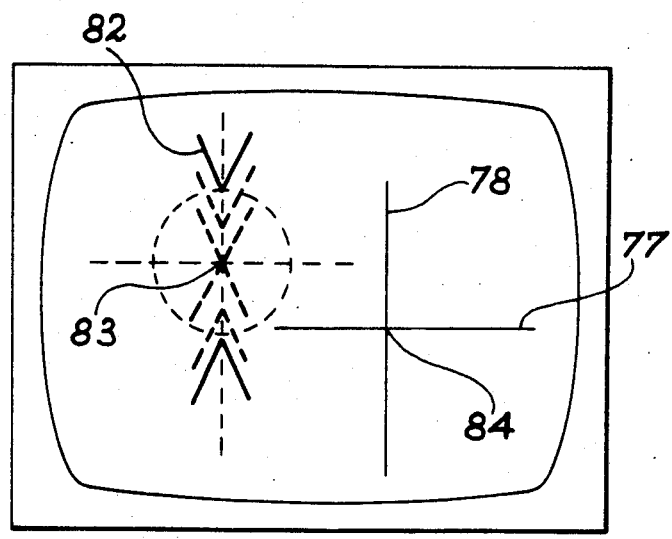
FIGS. 6A and 6B: Provide a better understanding of the height setting of the contact point.

Finally, the apparatus can comprise means for regulating the height of point 14 chosen on the cutting edge of the tool. These means intervene before or after the aforementioned calibration and setting operations. They are diagrammatically represented in FIG. 5. They comprise another condenser 70, e.g. having a light source 71 associated with a lens 72. This condenser is positioned so as to emit a light beam 73 parallel to the aforementioned direction Y and therefore parallel to axis X' of spindle 35. The chosen point 14 on the cutting edge of tool 9 is placed in said beam, e.g. by rotating capstan 8. These means for setting the height of the tool also comprise another mirror 70 inclined by 45° with respect to the direction of beam 73, which it reflects by 75 to 90° on a third reticule 76. This third reticule comprises two crossed perpendicular lines 77, 78, which are respectively parallel to directions Y, Z'. This reticule can be displaced in translation parallel to these directions by displacement means constituted by micrometer screws 79, 80. This third reticule defines another reference mark, which in this case makes it possible to set the height on the contact point. A video camera 81 makes it possible to obtain an enlarged image of reticule 76 on the screen of video projector 38. Spindle 35 is provided with a point 82 directed towards the axis X' of said spindle, which is rotated. The height regulation or setting of point 14 of the tool takes place in the manner shown in FIGS. 6A and 6B. FIG. 6A shows opposite images of point 82 obtained on the screen of projector 38, when said point rotates by 180° as a result of spindle 35. It is also possible to see the image of lines 77, 78 of reticule 76, whose intersection 84 does not coincide with the centre 83 of the circle described by point 82, which is here shown by the edge. The action of micrometer screws 79, 80 makes it possible to displace the reticule so as to ensure this coincidence and as shown by dotted lines in the drawing.

Figure 6B:
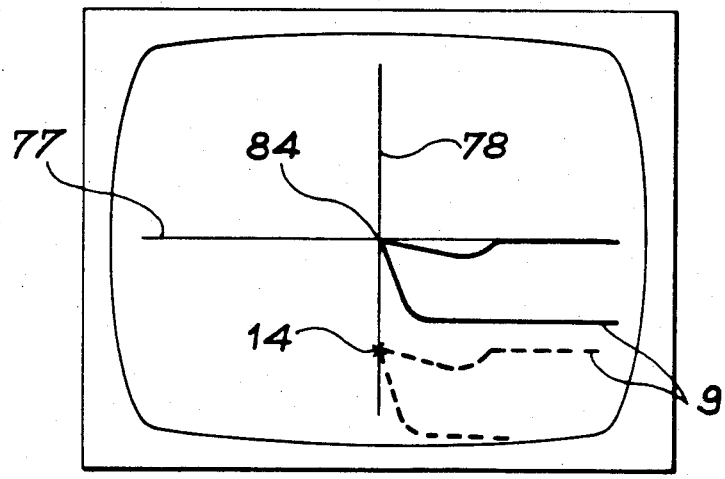

FIG. 6B shows the image appearing on the video screen when the preceding setting has been performed, the intersection 84 of lines 77, 78 of reticule 76 coinciding with the centre of the aforementioned circle. It has been assumed that point 82 has been removed from spindle 35. It is also possible to see the image of tool 9 and the selected point 14 on said edge. It is assumed that the latter is made to coincide with line 78 by movement of the slides. This point is raised until it coincides with the intersection point 84 of lines 77, 78, due to the vertical displacement means of tool holder 9, with respect to capstan 8. These means are e.g. micrometric displacement means 85, which are not shown in detail on the drawing. The height of the tool is then perfectly set.

The apparatus described hereinbefore leads to a considerable magnification or enlargement of the image of the tool as a result of the optical and video means used. It also makes it possible to obtain machining precisions better than one tenth of a micron.

What is claimed is:

1. A process for positioning a point of the cutting zone of a tool in a digitally controlled lathe, said lathe comprising a fixed frame and on the latter first and second slides, means for displacing these slides in translations respectively parallel to first and second directions X, Y which are perpendicular to one another, direction X being parallel to direction X' of a virtual axis of a spindle of the lathe, a capstan with a tool holder supported by one of said slides and means for displacing said capstan in rotation about a virtual rotation axis Z'Z perpendicular to the first and second directions, and a programmable control unit connected to the means for displacement in translation and rotation, in order to apply thereto displacement control signals, to maintain only said single point in contact with said part during machining, the process comprising optically determining the position of said point in an absolute fixed reference mark, wherein said optical determination comprises obtaining the image of said contact point and the image of a virtual relative mark with two perpendicular axes, then by rotating the capstan, displacement of the tool in the tool holder and displacement of the image of the relative mark, to bring about coincidence between the origin of the relative mark and the virtual rotation axis Z'Z of the capstan, said process then consisting of rotating the axes of the virtual relative mark and marking one of the two directions, so as to bring about coincidence between one of the axes of the virtual relative mark and the direction X' of the spindle, then bringing about coincidence between the chosen contact point and the origin of the virtual relative mark, the cutting zone of the tool being tangential to one of the two axes at said contact point, the orientation of the tool being chosen with respect to one of the two axes of the virtual relative mark; then obtaining the image of the absolute fixed reference mark, then displacing the slides to bring said contact point and the intersection point of the axes of the relative mark into coincidence with the origin of said absolute mark, the translation displacements of the slides being measured relative to the two axes of said absolute mark.

2. A process according to claim 1, wherein it also consists of marking the axis of the spindle in a plane perpendicular to the first and second direction X, Y, obtaining the image of another reference mark with two perpendicular axes, one of said two axes being parallel to the virtual axis of the spindle, then by translation movements of the image of said other reference mark bringing the intersection point of the two axes of said mark into coincidence with the virtual axis of the spindle, the tool then being displaced in the capstan parallel to the virtual axis of the spindle, so that the image of said contact point is made to coincide with the intersection of the axes of said other reference mark.

3. An apparatus for positioning a point of a cutting zone of a tool in a digitally controlled lathe, said lathe having a fixed frame and on the latter first and second slides, means for displacing these slides in translations respectively parallel to first and second directions which are perpendicular to one another, one of these directions being parallel to a rotation axis of a part-holding spindle of the lathe, a capstan with tool holder supported by one of the slides and means for rotating said capstan about a rotation axis perpendicular to the first and second directions, and a programmable control unit connected to the means for displacement in translation and rotation for the application thereto of displacement control signals, so that only said single point is kept in contact with said part during machining, means for fixing the position of said point in a virtual relative mark linked with the slides and means for determining the position of said point in an absolute reference mark linked with the frame, wherein this apparatus comprises means for obtaining the image of said contact point and mobile means making it possible to obtain the image of a virtual relative mark having two axes respectively parallel to the first and second directions, the origin of the image of the relative mark and the virtual image of the rotation axis being brought into coincidence and the axes of the relative mark being positioned parallel to the two directions, an angular orientation of the tool being chosen with respect to one of the two axes of the virtual relative mark, whilst the image of the contact point is made to coincide with the capstan axis; means for obtaining the image of the absolute fixed reference mark, the displacements of the slides bringing the contact point and the origin of the virtual relative mark into coincidence with the origin of said absolute mark, the rotation displacements of the capstan being defined for the control unit by angles measured with respect to one of the two axes of said absolute mark and translation displacements of the slides being measured with respect to the two axes of said absolute mark during machining.

4. An apparatus according to claim 3, wherein the means for obtaining the images of said contact point, the virtual relative mark and the absolute mark comprise a light source and a condenser emitting in the direction of the cutting zone of the tool a light beam parallel to said virtual rotation axis, a sloping plane mirror for reflecting the beam by 90° parallel to one of the two directions, an objective or lens for obtaining in an image plane the images of the contact point, the virtual relative mark and the absolute mark, as well as means for collecting these images, the virtual relative mark being formed by the image of a first planar reticule with two perpendicular crossed lines defining the axes of said relative mark, the intersection of the images of these two lines constituting the origin of the relative mark, said first reticule being placed on one of the slides on the path of the beam reflected by the mirror between said mirror and the objective, one of the lines of said first reticule being parallel to the axis of the part-holding spindle, the plane of said first reticule being perpendicular to the beam reflected by the mirror, said first reticule also being provided with means for the displacement in directions respectively parallel to said two directions, the absolute reference being formed by the image of a second planar reticule with two perpendicular crossed lines, integral with the machine frame, the plane of said second reticule being perpendicular to the beam from the condenser, the lines of said second reticule being respectively parallel to said two directions, the intersection of the images of the two lines of said second reticule constituting the origin of the absolute reference mark, the means for collecting the image of the cutting zone also collecting the images of the first and second reticules.

5. An apparatus according to claim 4, wherein the means for collecting the images of the cutting zone and the first and second reticules comprise a video camera connected to a video projection apparatus, said camera being carried by the slide on which is placed the first reticule, the lens of said camera being directed at the first reticule, said means making it possible to obtain an enlarged image of the cutting zone.

6. An apparatus according to claim 5, wherein it also comprises mobile means for defining another reference mark with two axes respectively parallel to the two directions, means for obtaining the image of said reference mark and the contact point, the intersection of the two axes of said other reference mark being made to coincide with the axis of the spindle, and means for displacing the tool holder parallel to the rotation axis in order to bring the image of the contact point into coincidence with the intersection point of the two axes of said other reference mark.

7. An apparatus according to claim 6, wherein said other reference mark is obtained from a third reticule with two perpendicular crossed lines respectively parallel to said rotation axis and to said second direction, the means for obtaining the enlarged images of said reference mark and said contact point comprising another condenser emitting a light beam parallel to said second direction, another sloping mirror for reflecting this beam by 90° parallel to the axis of the spindle towards the second reticule and a camera connected to the video projection apparatus for collecting the image of the third reticule and the image of the contact point.

* * * * *